(12) United States Patent
Kursun (10) Patent No.: US 11,095,722 B2
(45) Date of Patent: Aug. 17, 2021

(54) ADAPTIVE CROSS-CHANNEL TRACKING OF ELECTRONIC RECORDS SIGNATURE MODIFICATIONS

(71) Applicant: BANK OF AMERICA CORPORATION, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 79 days.

(21) Appl. No.: 16/532,896

(22) Filed: Aug. 6, 2019

(65) Prior Publication Data

US 2021/0044659 A1 Feb. 11, 2021

(51) Int. Cl.
| | |
|---|---|
| *H04L 29/08* | (2006.01) |
| *G06F 21/31* | (2013.01) |
| *G06F 16/182* | (2019.01) |
| *G06N 20/20* | (2019.01) |

(52) U.S. Cl.
CPC ........ *H04L 67/146* (2013.01); *G06F 16/1827* (2019.01); *G06F 21/316* (2013.01); *G06N 20/20* (2019.01)

(58) Field of Classification Search
CPC ... H04L 67/146; G06N 20/20; G06F 16/1827; G06F 21/316
USPC ........................................................ 709/224
See application file for complete search history.

(56) References Cited

U.S. PATENT DOCUMENTS

| | | | |
|---|---|---|---|
| 5,805,719 A | 9/1998 | Pare, Jr. et al. | |
| 6,792,536 B1 | 9/2004 | Teppler | |
| 6,941,285 B2 | 9/2005 | Sarcanin | |
| 7,152,045 B2 | 12/2006 | Hoffman | |
| 7,593,543 B1 * | 9/2009 | Herz | G06F 21/10 |
| | | | 375/134 |
| 7,631,193 B1 | 12/2009 | Hoffman | |
| 7,761,910 B2 | 7/2010 | Ransom et al. | |
| 8,165,343 B1 * | 4/2012 | McGowan | H04N 21/8358 |
| | | | 382/100 |
| 8,231,057 B1 * | 7/2012 | Buentello | G06K 9/2063 |
| | | | 235/462.11 |
| 8,316,237 B1 | 11/2012 | Felsher et al. | |
| 8,428,227 B2 | 4/2013 | Angel et al. | |

(Continued)

FOREIGN PATENT DOCUMENTS

WO    WO-2014078696 A2 *   5/2014   ........... G06Q 20/042

*Primary Examiner* — Wing F Chan
*Assistant Examiner* — Leon Y Tseng
(74) *Attorney, Agent, or Firm* — Michael A. Springs; Moore & Van Allen PLLC; R. W. McCord Rayburn (57) ABSTRACT

A system for modifying electronic records for tracking use is provided. The system comprises a controller configured for transforming an electronic record, the controller comprising a memory device with computer-readable program code stored thereon, a communication device connected to a network, and a processing device, wherein the processing device is configured to execute the computer-readable program code to: receive a request from a user device to access an electronic record during an interaction session; extract a session identifier signature for the interaction session; generate, with a transformation function, one or more modifications for the electronic record based on the session identifier signature; transform the electronic record to a modified record by applying the one or more modifications to the electronic record; and provide the modified record to the user device.

20 Claims, 7 Drawing Sheets

(56) References Cited

U.S. PATENT DOCUMENTS

| | | |
|---|---|---|
| 8,578,166 B2 | 11/2013 | De Monseignat et al. |
| 8,582,838 B1 * | 11/2013 | McCormick ....... G06K 9/00087 |
| | | 382/124 |
| 8,767,946 B1 | 7/2014 | Duva et al. |
| 8,781,105 B1 | 7/2014 | Duva et al. |
| 8,917,860 B2 | 12/2014 | Duva et al. |
| 9,036,808 B2 | 5/2015 | Kelley et al. |
| 9,118,669 B2 | 8/2015 | Moganti et al. |
| 10,032,010 B2 | 7/2018 | Turgeman et al. |
| 2003/0158960 A1 | 8/2003 | Engberg |
| 2005/0149759 A1 | 7/2005 | Vishwanath et al. |
| 2006/0293921 A1 | 12/2006 | McCarthy et al. |
| 2007/0255818 A1 | 11/2007 | Tanzer et al. |
| 2008/0149713 A1 * | 6/2008 | Brundage ............ G07D 7/0047 |
| | | 235/435 |
| 2011/0287748 A1 | 11/2011 | Angel et al. |
| 2012/0204032 A1 | 8/2012 | Wilkins et al. |
| 2018/0314816 A1 | 11/2018 | Turgeman et al. |
| 2019/0050550 A1 | 2/2019 | Berini et al. |
| 2019/0220863 A1 * | 7/2019 | Novick ............. H04W 12/1202 |

* cited by examiner

ADAPTIVE CROSS-CHANNEL TRACKING OF ELECTRONIC RECORDS SIGNATURE MODIFICATIONS

BACKGROUND

Unauthorized access and duplication of electronic records is a prevalent form of misappropriation that is still commonly used. While current systems attempt to apply simple and/or obvious distortions or markings to stored electronic records to discourage unauthorized use, the methods are unable to track the use of the records back to a source or across multiple communication channels. Therefore, there exists a need for an improved system for tracking electronic record use that is adaptive across various communication channels.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for modifying electronic records for tracking use, the system comprising: a controller configured for transforming an electronic record, the controller comprising a memory device with computer-readable program code stored thereon, a communication device connected to a network, and a processing device, wherein the processing device is configured to execute the computer-readable program code to: receive a request from a user device to access an electronic record during an interaction session; extract a session identifier signature for the interaction session; generate, with a transformation function, one or more modifications for the electronic record based on the session identifier signature; transform the electronic record to a modified record by applying the one or more modifications to the electronic record; and provide the modified record to the user device.

In one specific embodiment, the processing device is configured to execute the computer-readable program code to: after providing the modified record to the user device, receive a record during a subsequent interaction session via a communication channel; identify the record as the modified record by matching modification patterns of the record to the one or more modifications of the modified record; extract the session identifier signature associated with the record; determine that the session identifier signature is associated with unauthorized access; and mark the subsequent interaction session and the session identifier signature as being associated with unauthorized access. In another embodiment, the communication channel is a first channel, and wherein the processing device is configured to execute the computer-readable program code to: identify another interaction session in a second channel, the another interaction session comprising at least part of the session identifier signature; and mark the another interaction session as being associated with unauthorized access based on determining that the session identifier signature is associated with unauthorized access in the first channel.

In yet another embodiment, the processing device is further configured to execute the computer-readable program code to: determine a pattern of authorized access based on previous interaction sessions; compare a current pattern of the interaction session with the pattern of authorized access; and calculate an unauthorized access score based on comparing the current pattern to the pattern of authorized access, wherein the unauthorized access score is a quantification of a match between the current pattern and the pattern of authorized access. In yet another embodiment, generating the one or more modifications for the electronic record is further based on the unauthorized access score. In yet another embodiment, the processing device is further configured to execute the computer-readable program code to generate an additional modification for the electronic record based on the unauthorized access score exceeding a predetermined threshold.

In yet another embodiment, the session identifier signature comprises at least one of a user identification, a device identification, session or interaction identification, a connection identification, an Internet Protocol address, a cookie, a universally or globally unique identifier, a security token, a date, or a time. In yet another embodiment, the session identifier signature is a trackable token for tracing modifications back to one or more interaction sessions.

In yet another embodiment, the transformation function further comprises a random modification generator for generating one or more random modifications to be applied to the electronic record. In yet another embodiment, the one or more modifications comprise at least one of an alteration or addition of typed or script text, images, or formatting of the electronic record. In yet another embodiment, the one or more modifications include pixel level modification and tracking on an image of the electronic record.

A system for detecting and tracking unauthorized records is also provided. The system comprises: a controller configured for analyzing a record, the controller comprising a memory device with computer-readable program code stored thereon, a communication device connected to a network, and a processing device, wherein the processing device is configured to execute the computer-readable program code to: receive the record from a user device during an interaction via a communication channel, the record including one or more record modifications; analyze the one or more record modifications for known modification patterns; determine a match of the one or more record modifications to a known pattern; extract a session identifier signature associated with the known pattern; determine that the session identifier signature is associated with unauthorized access; and mark the interaction and the session identifier signature as being associated with unauthorized access.

In one specific embodiment, the communication channel is a first channel and the interaction is a first interaction, and wherein the processing device is configured to execute the computer-readable program code to: identify a second interaction in a second channel, the second interaction comprising at least part of the session identifier signature; and mark the second interaction as being associated with unauthorized access based on determining that the session identifier signature is associated with unauthorized access in the first channel.

In another embodiment, determining that the session identifier signature is associated with unauthorized access further comprises: comparing the session identifier signature to one or more known unauthorized access signatures associated with the known pattern; and calculating an unauthorized access score based on comparing the session identifier signature to the one or more known unauthorized access signatures, wherein the unauthorized access score is a quantification of a match between the session identifier signature and the one or more known unauthorized access signatures.

In yet another embodiment, the processing device is configured to execute the computer-readable program code to block subsequent interactions associated with the session identifier signature. In yet another embodiment, the session identifier signature is a trackable token for tracing modifications back to one or more interaction sessions.

A computer-implemented method leveraging machine learning for determining unauthorized access is also provided, the computer-implemented method comprising: determining a pattern of authorized account access during an authenticated interaction by a user; training a first machine learning model with the pattern of authorized account access; training a second machine learning model with incoming known patterns of unauthorized access; comparing a new pattern of a new interaction to the pattern of authorized access and the known patterns of unauthorized access; identifying a match between the new pattern and the known patterns of unauthorized access; and based on identifying the match, marking the new pattern and the new interaction as being associated with unauthorized access.

In one specific embodiment, determining a pattern of authorized account access comprises identifying a number of user-executed events during the authenticated interaction.

In another embodiment, comparing the new pattern to the pattern of authorized access and the known patterns further comprises comparing a number of events executed during the new interaction to the number of user-executed events during the authenticated interaction and a number of events executed during interactions associated with unauthorized access.

In yet another embodiment, the user-executed events comprise a viewing of an electronic record.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the system, as described herein leverage artificial intelligence, machine-learning, and/or other complex, specific-use computer systems to provide a novel approach for tracking and preventing unauthorized account access and, particularly, electronic record misappropriation. The system is configured to alter electronic records with traceable modification patterns which can be used as a signature for a specific interaction session in which the electronic record was previously used. In this way, when an attempt at unauthorized use of a modified electronic record later occurs, the system is able to identify the modification patterns, and trace the record back to an originating interaction session, thereby helping to identify and track unauthorized users, devices, and records. While current prevention methods typically focus on simply blurring an image of the record or modifying the record without the ability to track it, unauthorized access and use of records persists. As such, the present invention provides an improvement to electronic record security by providing intelligent record modification tracking which tie modified records to specific interaction sessions.

Furthermore, the session identifier signature may be used to identify and track other interactions across other communication channels. For example, a device identification number used by an identified unauthorized user during an online interaction may also be identified in another interaction for having called into a support phone line. As these patterns and relationships may be complex to identify, the system leverages machine learning models to learn from both authorized and unauthorized interactions to accurately identify patterns and associate related cross-channel interactions.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison).

As used herein, the term "user" may refer to any entity or individual associated with the adaptive record tracking system. In some embodiments, a user may be a computing device user, a phone user, a mobile device application user, a customer of an entity or business, a system operator, and/or employee of an entity (e.g., a financial institution). In one embodiment, a user may be a customer accessing a user account via an associated user device, wherein data from an interaction between the user and an entity is analyzed or processed by the system. In a specific embodiment, a user is a requestor of one or more electronic records such as an image of a check. In another specific embodiment, a user is a potential customer submitting a record in an attempt to complete a transaction (e.g. cash a check). In one embodiment, a user may be an unauthorized user or group attempting to access an account or record without authorization (e.g., misappropriation). In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, gaming devices, or any combination of the aforementioned. The device may be used by the user to access the system directly or through an application, online portal, internet browser, virtual private network, or other connection channel. In a specific embodiment, a user device may refer to an automated teller machine (ATM) configured to receive and process a record such as a check.

As used herein, the term "entity" may be used to include any organization or collection of users that may interact with the adaptive record tracking system. An entity may refer to a business, company, or other organization that either maintains or operates the system or requests use and accesses the system. In one embodiment, the entity may be a software development entity or data management entity. In a specific embodiment, the entity may be a cybersecurity entity or misappropriation prevention entity. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, "authentication information" may refer to any information that can be used to authenticate an identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. In one embodiment, authentication information may be used without authorization of the user to authenticate an unauthorized user without the authorized user knowing (e.g., unauthorized account or record access).

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise analyzing performance of one or more machine learning models or engines using performance metrics associated with one or more of the models. In another specific embodiment, monitoring may comprise determining a match between incoming data patterns and known data patterns to identify unauthorized data access and/or potential misappropriation.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity.

Figure 1:
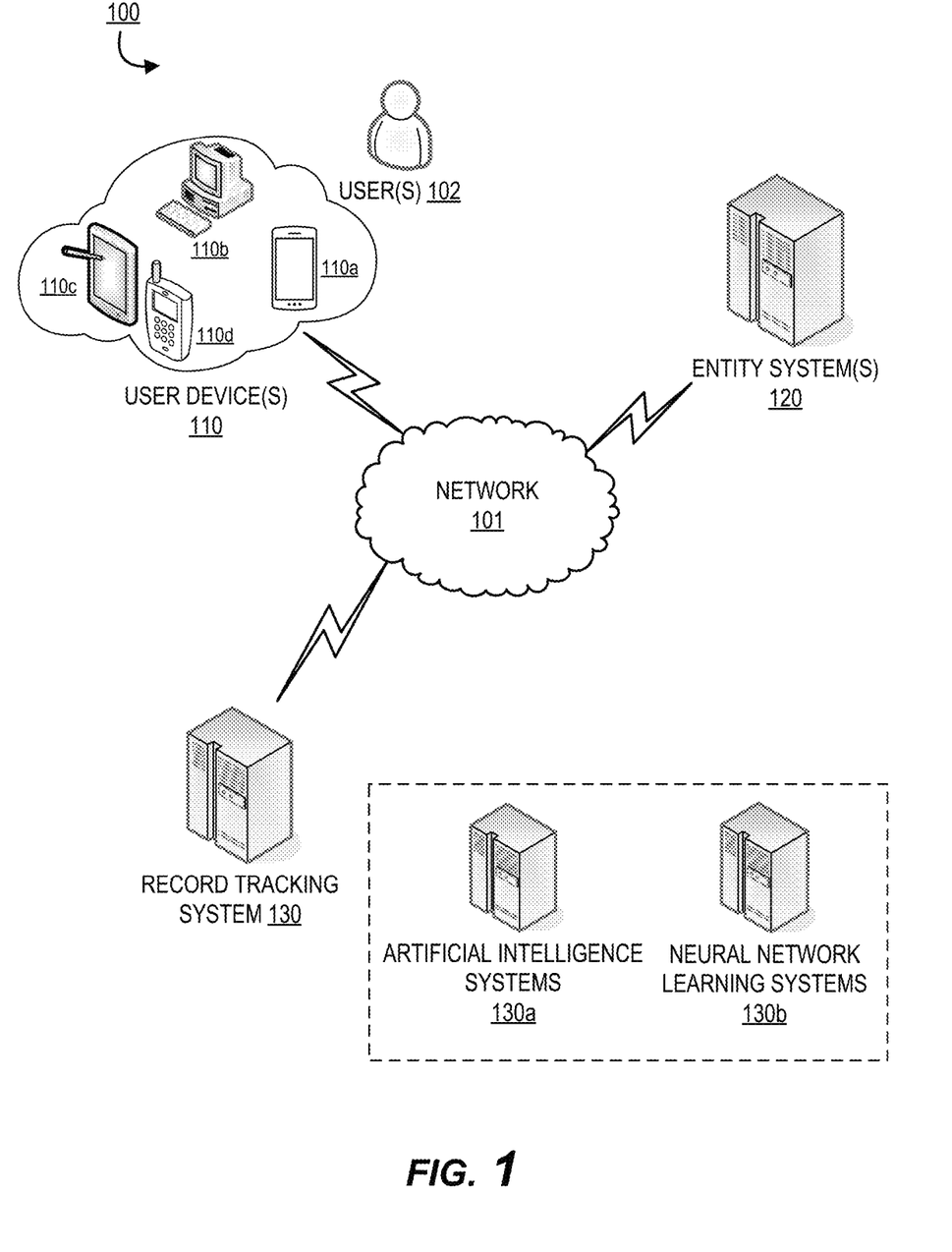
FIG. 1 provides an adaptive record tracking system environment, in accordance with one embodiment of the invention.

FIG. 1 provides an adaptive record tracking system environment 100, in accordance with one embodiment of the invention. As illustrated in FIG. 1, record tracking system 130 is operatively coupled, via a network 101, to the user device(s) 110 (e.g., a plurality of user devices 110a-110d) and the entity system(s) 120. In this way, the record tracking system 130 can send information to and receive information from the user device 110 and the entity system 120. In the illustrated embodiment, the plurality of user devices 110a-110d provide a plurality of communication channels through which the entity system 120 and/or the record tracking system 130 may communicate with the user 102 over the network 101.

In the illustrated embodiment, the record tracking system 130 further comprises an artificial intelligence (AI) system 130a and a machine learning system 130b which may be separate systems operating together with the record tracking system 130 or integrated within the record tracking system 130.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with one or more entity systems 120 via a user device 110 while a data flow between the user device 110 and the entity system 120 is intercepted and monitored by the record tracking system 130 over the network 101. In some embodiments a user 102 is a user requesting service from the entity or interacting with an account maintained by the entity system 120. In an alternative embodiment, the user 102 is an individual interacting with the record tracking system 130 over the network 101 and monitoring input of information from the entity systems 120 to the record tracking system 130 for processing and analysis (e.g., an employee of the entity operating and/or monitoring the systems 120, 130).

Figure 2:
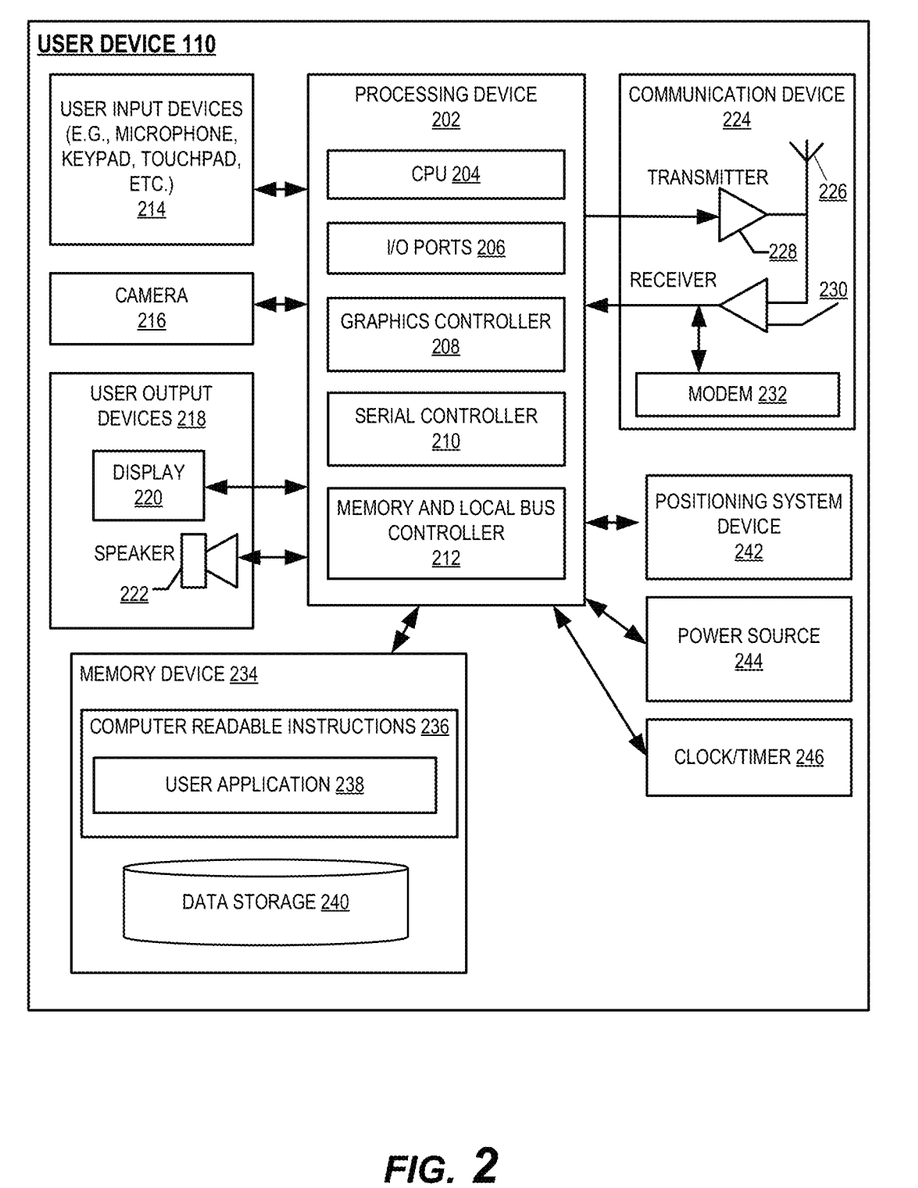
FIG. 2 provides a block diagram of a user device, in accordance with one embodiment of the invention.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. In one embodiment, the camera 216 may include a scanner, barcode reader, or any other image capturing device configured to capture an image or collect data from a hardcopy record. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In some embodiments, the user is a customer of a financial entity and the user application 238 is a resource management application providing access to a resource location maintained by the entity system 120 wherein the user may interact with a resource location via a user interface of the user application 238. In one embodiment, the user application 238 may be configured to allow a user 102 to request, access, and/or view electronic records on the user device 110, wherein the electronic records are provided and displayed to the user 102 on the user device 110.

The processing device 202 may be configured to use the communication device 224 to communicate with one or more other devices on a network 101 such as, but not limited to the entity system 120 and the record tracking system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Figure 3:
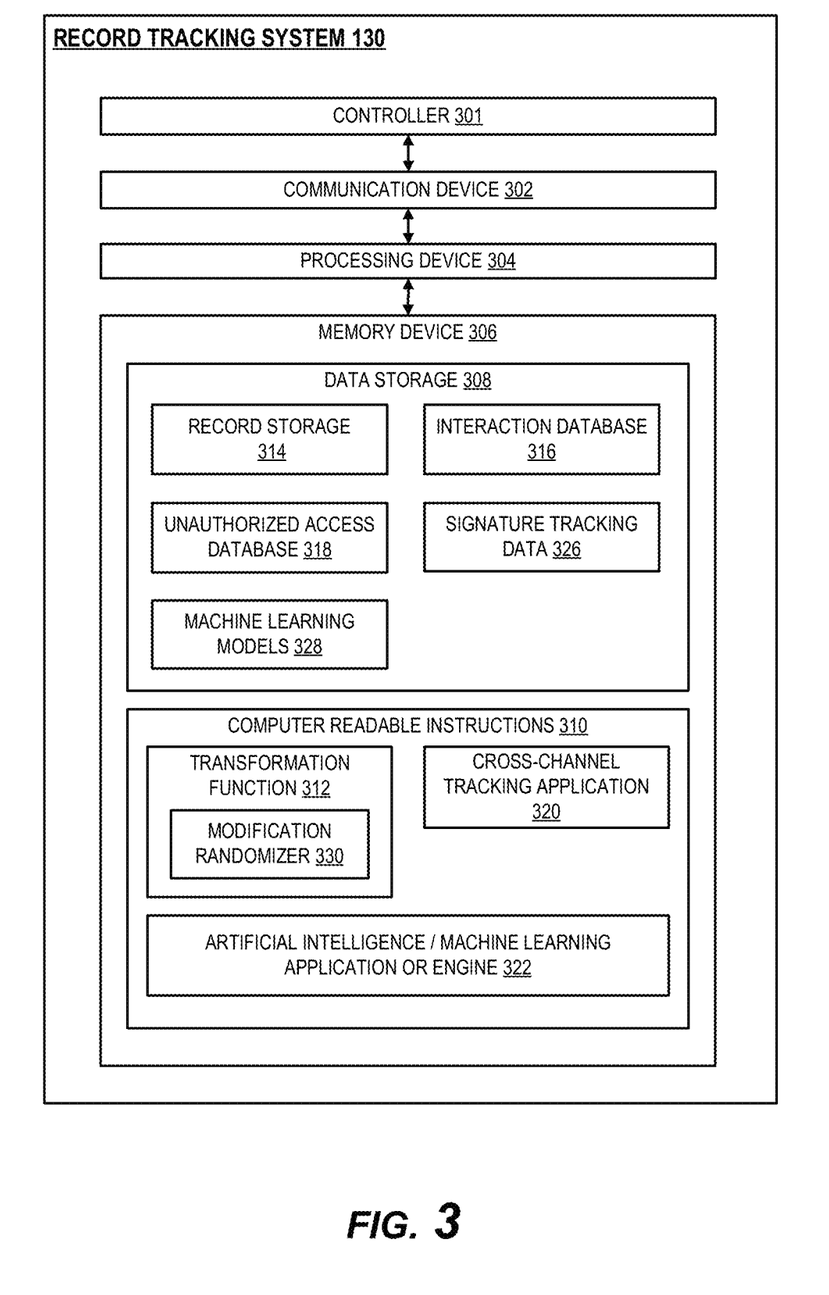
FIG. 3 provides a block diagram of a record tracking system, in accordance with one embodiment of the invention.

FIG. 3 provides a block diagram of a record tracking system 130, in accordance with one embodiment of the invention. The record tracking system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the record tracking system 130, in order to interface and manage data flow between systems while executing commands to control the systems. In some embodiments, the controller may be integrated into one or more of the systems described herein. In other embodiments, the controller may be a separate system or device. In some embodiments, the controller may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the record tracking system 130 comprises computer-readable instructions 310 stored in the memory device 306, which in one embodiment includes the computer-readable instructions 310 of a transformation function 312, a cross-channel tracking application, and an artificial intelligence application 314 which further comprises a machine learning engine. The transformation function 312 is configured to receive an input of session identifier signature information and output one or more record modifications. In some embodiments, the transformation function 312 is further configured to receive one or more modifications and trace them back to one or more specific session identifier signatures or information. In one embodiment, the transformation function 312 includes a modification randomizer 320 configured for generating trackable, randomized modifications for increased security. In one embodiment, the artificial intelligence application 322 and machine learning engine may be utilized by the cross-channel tracking application 320 and/or the transformation function 312 to analyze and match interaction session patterns and identifier signatures as described herein to distinguish authorized and unauthorized access to an account and/or records.

In some embodiments, the memory device 306 includes data storage 308 for storing data related to the system environment, but not limited to data created and/or used by the transformation function 312, cross-channel tracking application 320, and the artificial intelligence application and machine learning engine 322. Data stored in the data storage 308 may comprise record storage 314, an interaction database 316, an unauthorized access database 318, signature tracking data 326, and one or more machine learning models 328.

Record storage 314 is used to store records used by the systems described herein. In some embodiments, the records may include electronic records such as files, data, images, and the like. In a specific example, the electronic records may include stored images of previously deposited checks. While the record storage 314 is shown in FIG. 3 as part of the record tracking system 130, in other embodiments, record storage may be included on one or more other systems (e.g., entity systems 120) to supplement or as an alternative to record storage 314 on the record tracking system 130. In one embodiment, records are stored on the entity systems 120, wherein the record tracking system 130 pulls the records from the entity systems 120 upon a user request for record access. The record tracking system 130 may intercept and modify a record sent to a user device 110 from an entity system 120 following a user request to record access.

The interaction database 316 is used to store information regarding past interactions (e.g., account actions or events, transactions, communications, inputs) during a session (e.g., an online banking session) with the user 102. In some embodiments, the interaction database 316 may be configured to store data from an incoming data stream in real-time. The interaction database 316 may further include information or data related to the interactions such as user data, session identifier data, and the like. The system may be configured to access and update stored information and data stored in the interaction database 316 as additional information is collected. The unauthorized access database 318 is used to store interaction data associated with unauthorized access (i.e., misappropriation). In some embodiments, the unauthorized access database 318 may comprise records, session identifier data, interaction data, and the like associated with identified or suspected unauthorized access. In some embodiments, the unauthorized access database 318 may include a record of records, users, devices, or the like prohibited from further interacting with the systems described herein.

Signature tracking data 326 may include any information and data associated with session identifier signatures or any information used to track a record, user, or device as described herein. In one embodiment, the signature tracking data 326 includes the one or more modifications generated by the transformation function 312 for modifying records. In one embodiment, the signature tracking data 326 further includes tracking information related to the record modifications for matching the modified records with one or more associated sessions. For example, the signature tracking data 326 may include one or more look-up tables, tokens, hashes, patterns, or the like for tracing record modifications back to a specific session.

In one embodiment of the invention, the record tracking system 130 may associate with applications having computer-executable program code that instruct the processing device 304 to perform certain functions described herein. In one embodiment, the computer-executable program code of an application associated with the user device 110 and/or the entity systems 120 may also instruct the processing device 304 to perform certain logic, data processing, and data storing functions of the application.

Embodiments of the record tracking system 130 may include multiple systems, servers, computers or the like maintained by one or many entities. In some embodiments, the record tracking system 130 may be part of the entity systems 120. In other embodiments, the entity systems 120 are distinct from the record tracking system 130. The record tracking system 130 may communicate with the entity systems 120 via a secure connection generated for secure encrypted communications between the two systems either over the network 101 or alternative to the network 101.

Figure 4:
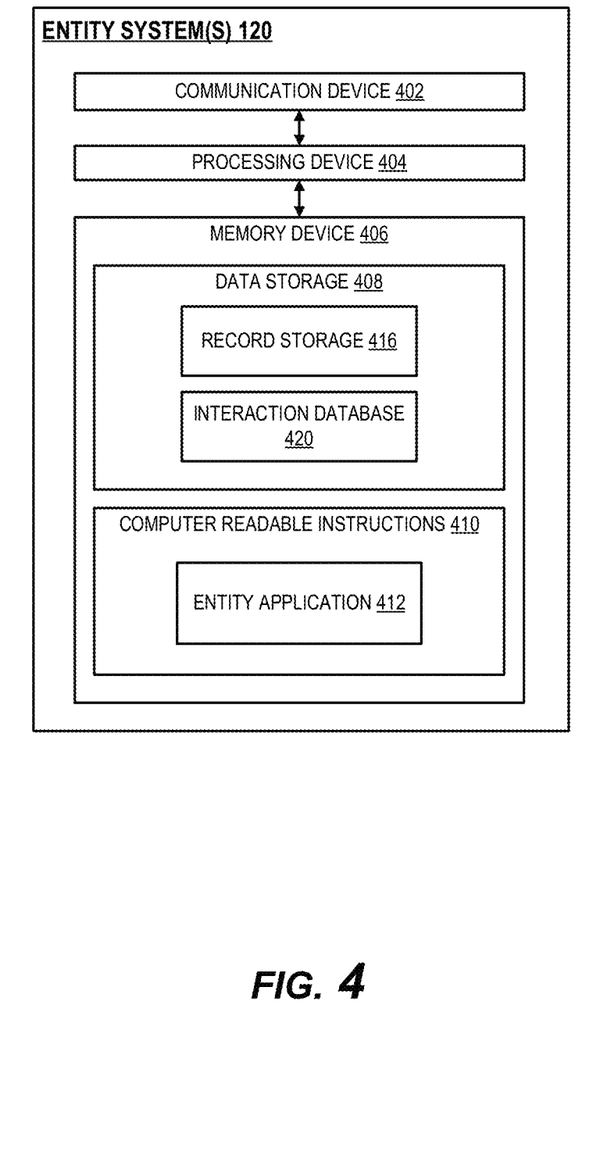
FIG. 4 provides a block diagram of an entity system, in accordance with one embodiment of the invention.

As illustrated in detail in FIG. 4, the environment 100 further includes one or more entity systems 120 which are connected to the user device 110 and the record tracking system 130. The entity systems 120 may be associated with one or more entities, institutions or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110 and the record tracking system 130 to provide access records and accounts stored and maintained on the entity systems 120. In some embodiments, the entity system 120 may communicate with record tracking system 130 during an interaction with a user 102 in real-time, wherein user interactions may be monitored and processed by the record tracking system 130. In some embodiments, data storage 408 comprises record storage 416 and/or interaction database 420 to either supplement or replace the record storage 314 and/or interaction database 316 of the record tracking system 130 as previously discussed.

The systems of the environment 100 are used to track use of records, particularly electronic records, through trackable modifications applied to the records. As previously discussed, the system is configured to alter electronic records with traceable modification patterns which can be used as signature for a specific interaction session in which the electronic record was previously used. In this way, when an attempt at unauthorized used of a modified electronic record occurs later, the system is able to identify the modification patterns, and trace the record back to an originating interaction session, thereby helping to identify and track unauthorized users, devices, and records.

"Records," as used herein, may refer to any form of documentation or data stored as a piece of evidence of a past occurrence. A record may be a handwritten, typed, printed, or otherwise physical record such as a receipt, voided or deposited check, or the like. Alternatively, a record may be an electronic record such as an electronic file, recording, image, or other form of electronic information that may be stored. In one embodiment, a record may include an image of a physical record such as a captured electronic image of a physical document. In a specific embodiment, an electronic record may comprise an electronic image of a previously deposited check.

Records may be modified by the system to generate a trackable modified record. Modifications to a record may include any alteration, disruption, addition or the like applied to a record which changes the record in any way. Modifications may comprise alterations or additions to text of the record including changes to the text font, color, or content (e.g., varying words and/or numbers). Modified text may further comprise modifications to handwritten signatures which may assist in preventing forgery. In some embodiments, the modifications may comprise alterations or additions to images or other objects in the record. For example, an object may be resized, repositioned, reoriented, recolored, or the like relative to the images original appearance. In some embodiments, the modifications may further comprise alterations or additions to a background or watermark of the record. In some embodiments, the modifications may comprise the application of filters or the like for altering an overall appearance of the record (e.g., blur effect). In yet other embodiments, wherein the record is an electronic record, the modifications may comprise alterations or additions to essential and/or non-essential portions of code or other data associated with the electronic record. In a specific embodiment, the modifications may include inserting a code portion into the electronic record for the purpose of tracking the electronic record. In yet other embodiments, modifications to the record may comprise alterations or additions of one or more pixels of an image of a record. These modifications may further comprise pixel level tracking of the image, wherein individual pixels may be intelligently modified to track use of the record image.

In some embodiments, the modifications applied to a record may be subtle, wherein the modifications to the record may imperceptible or near-imperceptible to the human eye, wherein the modifications are not readily noticeable or distinguishable by a user without use of enhance viewing techniques (e.g., pixel level modification and tracking). In another embodiment, the modifications applied to a record are imperceptible and are instead incorporated into a non-viewable portion of the record itself (e.g., code portions inserted into image).

Figure 5A:
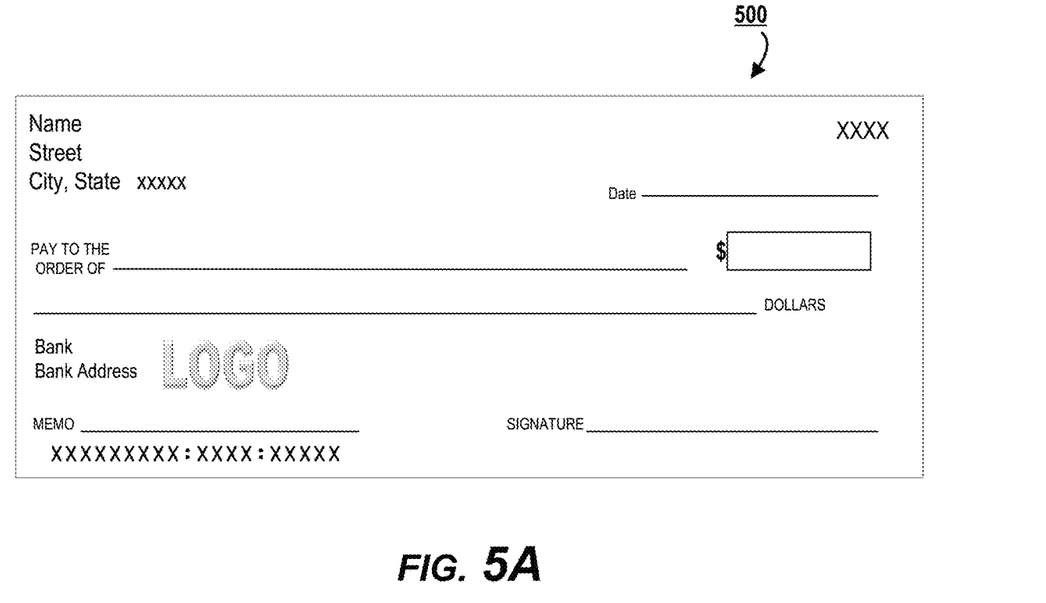
FIG. 5A provides an illustration of an unmodified record, in accordance with one embodiment of the invention.
Figure 5B:
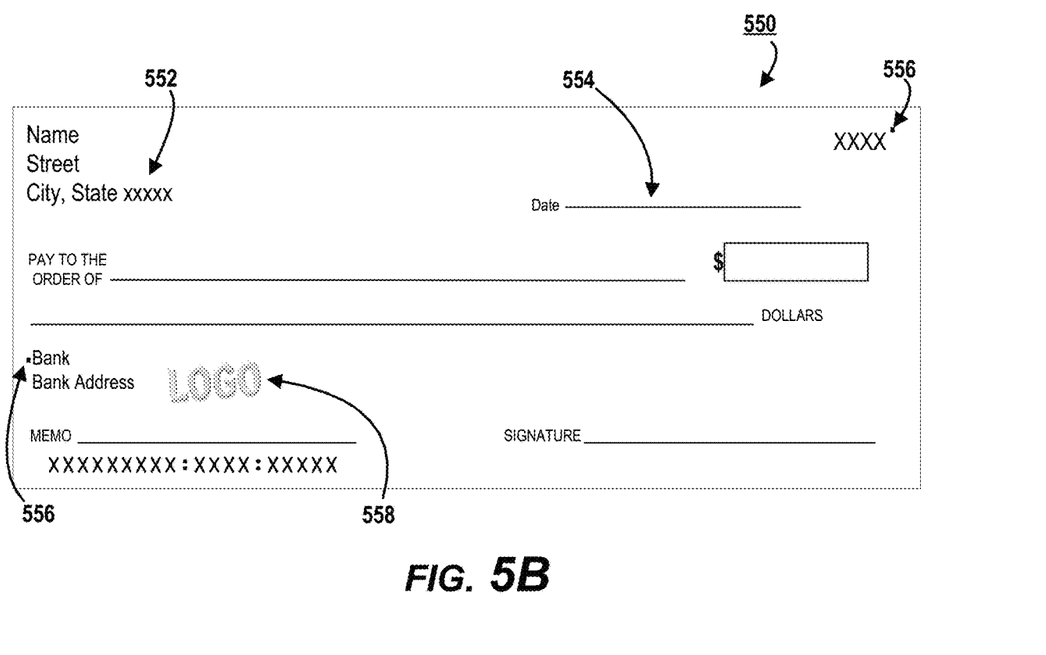
FIG. 5B provides an illustration of a modified record, in accordance with one embodiment of the invention.

FIGS. 5A and 5B provide, respectively, illustrations of a non-modified record and a modified record, in accordance with a specific embodiment of the invention. FIGS. 5A and 5B provide images of a check. In an exemplary embodiment, a historical checks may be typically viewed by a user accessing an online banking account. FIG. 5A provides an illustration of a non-modified check image 500 as it may be stored on a system such as an entity system 120 or the record tracking system 130. The system described herein may generate a modified version of the check (i.e., the record) to present to the user during the online banking session as illustrated in FIG. 5B. The modified check 550 in FIG. 5B comprises modifications such as a altered text in the form of removed spaces before the zip code 552; a repositioned object in the form of a shifted date line 554; altered pixels 556 for pixel based tracking; and a resized and reoriented logo image 558. It should be understood that the modifications of FIGS. 5A and 5B are merely exemplary and should not be seen as limiting. It should also be understood that the modifications of FIGS. 5A and 5B may be emphasized or exaggerated for the purposes of discussion, whereas actual modifications may be more subtle and imperceptible or near-imperceptible to the human eye.

Figure 6:
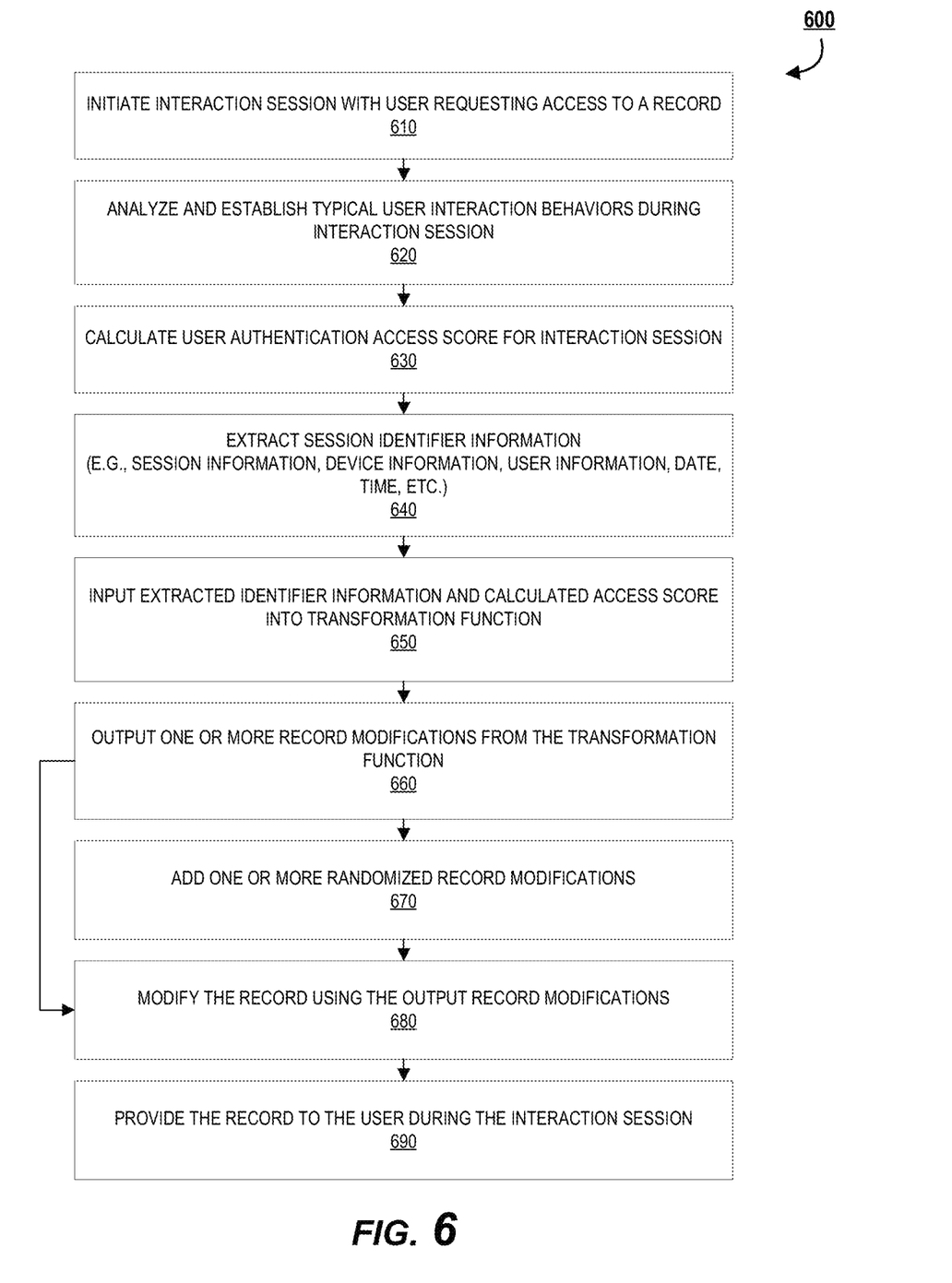
FIG. 6 provides a high level process flow for generating trackable record modifications, in accordance with one embodiment of the invention.

FIG. 6 provides a high level process flow for generating trackable record modifications, in accordance with one embodiment of the invention. As illustrated in block 610 of FIG. 6, the system first initiates an interaction session with a user. An interaction session is a specific instance or occurrence during which an interaction with a user is carried out over a communication channel. In a specific example, an interaction session may include a user logging in or otherwise authenticating the user's identify to access an account of the user (e.g., a financial account) on a user device. During the interaction session, system may receive a request from the user to access a record. For example, a user may click a link or otherwise navigate through a user application to view images of previously deposited checks.

As illustrated in block 620, the system analyzes the user's behavior and establishes typical user interaction behaviors and patterns. Behaviors and patterns of the user may include actions or events performed by the user during an interaction session (e.g., calling a support line phone number, clicking a link, viewing a record, etc.). Behaviors and patterns may include a number of times or velocity (i.e., actions per unit time) that the action or event is performed by the user. In some embodiments, the behaviors and patterns of the user are determined or built over a period of time during multiple authenticated sessions. In one embodiment, the system trains a machine learning model with the typical user interaction behaviors and patterns so that the machine learning model may determine that a user is not an unauthorized user.

As illustrated in block 630, the system may calculate a user authentication access score for the interaction session. A user authentication access score is a quantification of a match between a pattern from a current interaction session and a previously learned pattern of authorized access. In one embodiment, the access score may be a percent match between the compared patterns, wherein the access score evaluated relative to a predetermined threshold. In one embodiment, the user authentication access score represents a confidence that a requesting user is an authorized user and not an unauthorized user.

As illustrated in block 640, the system extracts session identifier information associated with an interaction session which acts as an identifying signature for a particular interaction session. In some embodiments, a session identifier signature may comprise various identifying information such as user identification information (e.g., a username, password), device identification information (e.g., device model number), session or interaction identification, connection identification, Internet Protocol (IP) address, cookie, universally or globally unique identifier, security token, date, or time.

As illustrated in block 650, the system inputs the extracted session identifier signature information into a transformation function configured to translate the session identifier signature information into one or more modifications for the requested record. In one embodiment, the system also inputs the calculated access score into the transformation function. As illustrated in block 660, the system outputs one or more modifications for the record from the transformation function based on the inputs. The session identifier signature acts as a trackable token for tracing modifications back to one or more interaction sessions. As illustrated in block 670, in one embodiment, the system may be configured to add one or more additional, randomized record modifications to the output modifications generated by the transformation function.

As illustrated in block 680, the system modifies the record using the record modifications generated and output by the transformation function. The system then provides the modified record to the user during the interaction session as illustrated in block 690. Providing the record to the user may comprise displaying the modified record on a display of a user device. By only providing modified records to users, attempts at misappropriation using the modified records may tracked to identify unauthorized users.

Figure 7:
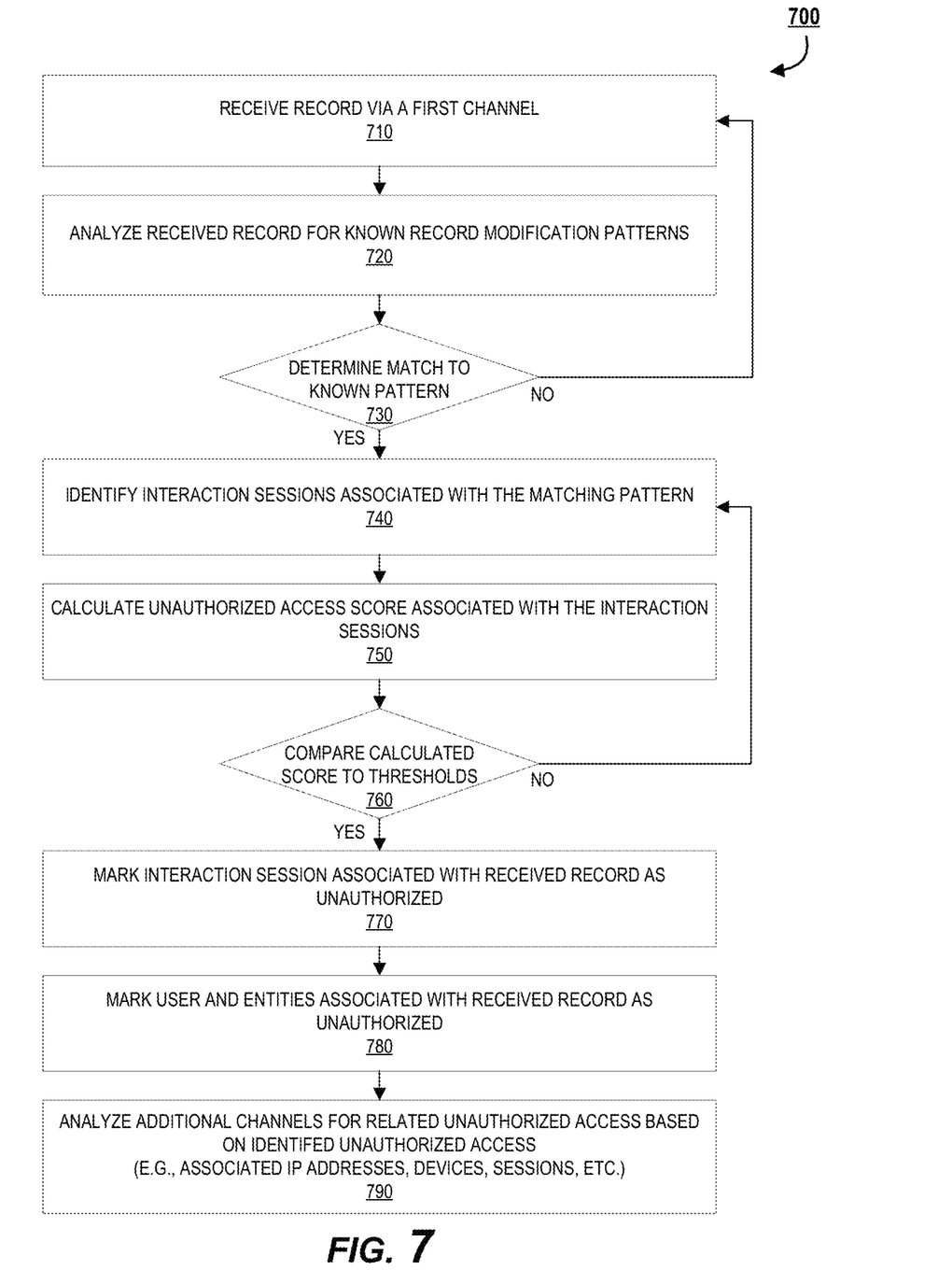
FIG. 7 provides a high level process flow for identifying unauthorized access using trackable record modifications, in accordance with one embodiment of the invention.

FIG. 7 provides a high level process flow for identifying unauthorized access using trackable record modifications, in accordance with one embodiment of the invention. As illustrated in block 710 of FIG. 7, the system receives a record via a communication channel after the modified record has been provided at the end of the process flow described with respect to FIG. 6. The system analyzes the received record for known record modification patterns as illustrated in block 720, and determines a match to a known modification pattern as illustrated in block 730. In some embodiments, the known modification pattern may be associated with previously identified unauthorized access. In another embodiment, a machine learning model is trained with known unauthorized access patterns to match one or more portions of known patterns to new, incoming interactions.

As illustrated in block 740, the system identifies one or more interaction sessions associated with the matching modification pattern. The system analyzes the identified patterns of the modifications present on the received records and inputs the modifications back into the transformation function which is configured to output a corresponding session identifier signature associated with an originating interaction session.

As illustrated in block 750, the system may calculate an access score associated with unauthorized access of the interaction sessions. The access score is a quantification of a match between a pattern from a current interaction session and a known pattern of unauthorized use and/or misappropriation. In one embodiment, the access score may be a percent match between the compared patterns, wherein the access score evaluated relative to a predetermined threshold. In one embodiment, the user authentication access score represents a confidence that the interaction session is associated with unauthorized access. As illustrated in block 760, the system compares the calculated score to one or more predetermined thresholds to determine if the interaction session is associate unauthorized access and/or attempted misappropriation.

If the calculated score exceeds the predetermined threshold, the system marks the interaction session associated with the received record as being associated with unauthorized access as illustrated in block 770. As illustrated in block 780, the system marks any users and entities associated with the received record as being associated with unauthorized access. Marking a record and/or interaction session as being associated with unauthorized access may further extend the marking to other aspects of the session identifier signature such as other user devices, IP addresses, connections, or the like. In some embodiments, marking an interaction session and/or record as being associated with unauthorized access further comprises sequestering portions of a session identifier signature and blocking subsequent interaction associated with one or more portions of the session identifier signature (e.g., a quarantine database). In another embodiment, the system further tracks one or more portions of the session identifier signature identified as being associated with unauthorized access and/or misappropriation to identify similar unauthorized users, groups, strategies, system vulnerabilities and the like.

As illustrated in block 790, the system may analyze additional channels for related unauthorized access based on the identified unauthorized access in the original channel. In some embodiments, the system leverages a machine learning technology to learn from portions of known session identifier signature information associated with unauthorized access and apply the identified patterns and session identifier information across additional channel to identify additional unauthorized access attempts.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with record modification for tracking and preventing unauthorized access.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for state-based learning and neural network reconfiguration, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for modifying electronic records for tracking use, the system comprising:
 a controller comprising a memory device with computer-readable program code stored thereon, a communication device connected to a network, and a processing device, wherein the processing device is configured to execute the computer-readable program code to:
 receive a request from a user device to access an electronic record during an interaction session, wherein the electronic record comprises a stored image of a check, and wherein accessing the electronic record comprises viewing the stored image of the check;
 extract a session identifier signature for the interaction session;

determine a pattern of authorized access based on previous interaction sessions;

compare a current pattern of the interaction session with the pattern of authorized access;

calculate an unauthorized access score based on comparing the current pattern of the interaction session to the pattern of authorized access, wherein the unauthorized access score is a quantification of a match between the current pattern of the interaction session and the pattern of authorized access;

generate, with a transformation function, one or more modifications for the electronic record based on the session identifier signature;

generate, with the transformation function, an additional modification for the electronic record based on the unauthorized access score exceeding a predetermined threshold;

transform the electronic record to a modified record by applying the one or more modifications and the additional modification to the electronic record; and provide the modified record to the user device.

2. The system of claim 1, wherein the processing device is configured to execute the computer-readable program code to:

after providing the modified record to the user device, receive another record during a subsequent interaction session via a communication channel;

identify the other record as the modified record by matching modification patterns of the other record to the one or more modifications of the modified record;

extract the session identifier signature associated with the record;

determine that the session identifier signature is associated with unauthorized access; and mark the subsequent interaction session and the session identifier signature as being associated with unauthorized access.

3. The system of claim 2, wherein the communication channel is a first channel, and wherein the processing device is configured to execute the computer-readable program code to:

identify another interaction session in a second channel, the other interaction session comprising at least part of the session identifier signature; and mark the other interaction session as being associated with unauthorized access based on determining that the session identifier signature is associated with unauthorized access in the first channel.

4. The system of claim 1, wherein the session identifier signature comprises at least one of a user identification, a device identification, a session identification, an interaction identification, a connection identification, an Internet Protocol address, a cookie, a universally or globally unique identifier, a security token, a date, or a time.

5. The system of claim 1, wherein the session identifier signature is a trackable token for tracing modifications back to one or more interaction sessions.

6. The system of claim 1, wherein the transformation function further comprises a random modification generator for generating one or more random modifications to be applied to the electronic record.

7. The system of claim 1, wherein the one or more modifications comprise at least one of an alteration or addition of typed or script text, images, or formatting of the electronic record.

8. The system of claim 1, wherein the one or more modifications comprise pixel level modification and tracking on the stored image of the check.

9. A system for detecting and tracking unauthorized records, the system comprising:

a controller comprising a memory device with computer-readable program code stored thereon, a communication device connected to a network, and a processing device, wherein the processing device is configured to execute the computer-readable program code to:

receive a request from a first user device to access a first record during a first interaction, wherein the first record comprises a stored image of a check, and wherein accessing the first record comprises viewing the stored image of the check;

extract a first session identifier signature for the first interaction;

determine a pattern of authorized access based on previous interactions;

compare a current pattern of the first interaction with the pattern of authorized access;

calculate an unauthorized access score based on comparing the current pattern of the first interaction to the pattern of authorized access, wherein the unauthorized access score is a quantification of a match between the current pattern of the first interaction and the pattern of authorized access;

generate, with a transformation function, one or more record modifications for the first record based on the first session identifier signature;

generate, with the transformation function, an additional record modification for the first record based on the unauthorized access score exceeding a predetermined threshold;

transform the first record to a modified first record by applying the one or more record modifications and the additional record modification to the first record;

provide the modified first record to the first user device;

receive a second record from a second user device during a second interaction via a communication channel, the second record comprising the one or more record modifications and the additional record modification, the second record comprising the stored image of the check;

analyze the one or more record modifications and the additional record modification for known modification patterns;

determine a match of the one or more record modifications and the additional record modification to a known pattern;

extract a second session identifier signature associated with the known pattern;

determine that the second session identifier signature is associated with unauthorized access; and mark the second interaction and the second session identifier signature as being associated with unauthorized access.

10. The system of claim 9, wherein the communication channel is a first channel, and wherein the processing device is configured to execute the computer-readable program code to:

identify a third interaction in a second channel, the third interaction comprising at least part of the second session identifier signature; and mark the third interaction as being associated with unauthorized access based on determining that the second session identifier signature is associated with unauthorized access in the first channel.

11. The system of claim 9, wherein determining that the second session identifier signature is associated with unauthorized access further comprises:
comparing the second session identifier signature to one or more known unauthorized access signatures associated with the known pattern; and
calculating another unauthorized access score based on comparing the second session identifier signature to the one or more known unauthorized access signatures, wherein the other unauthorized access score is a quantification of a match between the second session identifier signature and the one or more known unauthorized access signatures.

12. The system of claim 9, wherein the processing device is configured to execute the computer-readable program code to block subsequent interactions associated with the second session identifier signature.

13. The system of claim 9, wherein the second session identifier signature is a trackable token for tracing modifications back to one or more interaction sessions.

14. The system of claim 9, wherein the one or more record modifications comprise pixel level modification and tracking on the stored image of the check.

15. A computer program product for modifying electronic records for tracking use, wherein the computer program product comprises a non-transitory computer-readable medium comprising computer-readable code, the computer-readable code, when executed by a processing device, causes the processing device to:
receive a request from a user device to access an electronic record during an interaction session, wherein the electronic record comprises a stored image of a check, and wherein accessing the electronic record comprises viewing the stored image of the check;
extract a session identifier signature for the interaction session;
determine a pattern of authorized access based on previous interaction sessions;
compare a current pattern of the interaction session with the pattern of authorized access;
calculate an unauthorized access score based on comparing the current pattern of the interaction session to the pattern of authorized access, wherein the unauthorized access score is a quantification of a match between the current pattern of the interaction session and the pattern of authorized access;
generate, with a transformation function, one or more modifications for the electronic record based on the session identifier signature;
generate, with the transformation function, an additional modification for the electronic record based on the unauthorized access score exceeding a predetermined threshold;
transform the electronic record to a modified record by applying the one or more modifications and the additional modification to the electronic record; and
provide the modified record to the user device.

16. The computer program product of claim 15, wherein the computer-readable code, when executed by the processing device, causes the processing device to:
after providing the modified record to the user device, receive another record during a subsequent interaction session via a communication channel;
identify the other record as the modified record by matching modification patterns of the other record to the one or more modifications of the modified record;
extract the session identifier signature associated with the record;
determine that the session identifier signature is associated with unauthorized access; and
mark the subsequent interaction session and the session identifier signature as being associated with unauthorized access.

17. The computer program product of claim 16, wherein the communication channel is a first channel, and wherein the computer-readable code, when executed by the processing device, causes the processing device to:
identify another interaction session in a second channel, the other interaction session comprising at least part of the session identifier signature; and
mark the other interaction session as being associated with unauthorized access based on determining that the session identifier signature is associated with unauthorized access in the first channel.

18. The computer program product of claim 15, wherein the session identifier signature comprises at least one of a user identification, a device identification, session or a session identification, an interaction identification, a connection identification, an Internet Protocol address, a cookie, a universally or globally unique identifier, a security token, a date, or a time.

19. The computer program product of claim 15, wherein the session identifier signature is a trackable token for tracing modifications back to one or more interaction sessions.

20. The computer program product of claim 15, wherein the one or more modifications comprise pixel level modification and tracking on the stored image of the check.

* * * * *